United States Patent [19]

Nuese

[11] 3,868,633

[45] Feb. 25, 1975

[54] BLOCK CODED COMMUNICATION SYSTEM

[75] Inventor: Carlos Nuese, San Diego, Calif.

[73] Assignee: The United States of America as represented by the Secretary of the Navy, Washington, D.C.

[22] Filed: Dec. 17, 1973

[21] Appl. No.: 425,580

[52] U.S. Cl. .................................... 340/146.1 BA

[51] Int. Cl. ........................ H041 1/14, G08c 25/02

[58] Field of Search ............................ 340/146.1 BA

[56] References Cited

UNITED STATES PATENTS

| | | | |
|---|---|---|---|
| 3,158,684 | 11/1964 | Maejima | 340/146.1 BA |
| 3,336,576 | 8/1967 | Sourgens | 340/146.1 BA |
| 3,582,786 | 6/1971 | Bruglemans | 340/146.1 BA |
| 3,680,045 | 7/1972 | Meidan | 340/146.1 BA |
| 3,721,958 | 3/1973 | Dixon | 340/146.1 BA |

OTHER PUBLICATIONS (51509 0038) Maiwald, D. et al. *Error Recovery in Data Transmission*, In IBM Tech. Disc. Bull. 13(10): p. 3162–3. March, 1971. 340/146.IBA.

*Primary Examiner*—Malcolm A. Morrison
*Assistant Examiner*—R. Stephen Dildine, Jr.
*Attorney, Agent, or Firm*—R. S. Sciascia; G. J. Rubens

[57] ABSTRACT

A noisy forward communication channel is employed to transfer data which has been symbolically coded and also to transfer correction instructions; a noiseless feedback channel is used to return each symbol as it is received to the sending station. The apparatus transfers binary digital data without excessive redundancy, delay or complexity by correcting transmission errors by means of correction instructions as opposed to retransmitting the entire block of data.

7 Claims, 4 Drawing Figures

BLOCK CODED COMMUNICATION SYSTEM

BACKGROUND OF THE INVENTION

In digital communication systems, feedback is used with or without the use of error detecting and correcting codes. Transfer of data without coding is feasible if anticipated errors can be tolerated. Block and convolutional coding procedures can be used to correct errors without the use of feedback. In principle, an error-free transmission can be obtained by means of a very long block length. In practice, however, only finite-length codes can be used.

The most common use of feedback is for the retransmission of entire blocks after error detection. Delay and redundancy are dependent on the number of transmissions required to obtain an error-free block on reception. An existing system known as the automatic repeat request utilizes a four-out-of-seven code in which each block of seven symbols is retransmitted until it is successfully received. A noiseless, or relatively noiseless, feedback channel and a noisy forward channel exists if the receiving station has more power available to it for communication than the sending station, or when the receiving station is subject to more local noise or interference in the transmitting station. Examples include a satellite which cannot carry a very large source of power, ships at sea which are subject to local interference from their own radar systems, and military units attempting to send messages covertly, with a minimum of energy emission.

SUMMARY OF THE INVENTION

A block coded digital communication system employing noiseless feedback is disclosed. A noisy forward communication channel is used to transfer data which has been symbolically coded and also to transfer corrections from one station to another, while a noiseless feedback channel is used to return each symbol as it is received to the sending station. A block of $N$ symbols is transmitted, each block comprises $K$ information symbols, where each of the $K$ information symbols conveys one bit of information. The $K$ symbols in a block are formed into G groups of symbols, where the first group includes $(Q-1)$ information symbols, and where the remaining $(G-1)$ groups each includes $(Q-2)$ information symbols. A separator symbol which is the inverse of the information symbol that it follows is transmitted after each group of symbols. $Q$ correction symbols are sent after each error is detected and are inserted after the error, where $Q$ is the number of correction symbols to correct an error. If the number of errors, $e$, is less than $E$, which is the largest number of errors which can be corrected, $(E-e)Q$ reversal symbols are sent to complete the $N$ symbols of the block.

OBJECTS OF THE INVENTION

It is the foremost object of the present invention to disclose improved digital communication systems for improving system performance without excessive redundancy, delay, or complexity, which is achieved by means of a noiseless feedback channel and block coding.

Other objects, advantages and novel features of the invention will become apparent from the following detailed description of the invention when considered in conjunction with the accompanying drawings.

DESCRIPTION OF THE PREFERRED EMBODIMENT

Figure 1A:
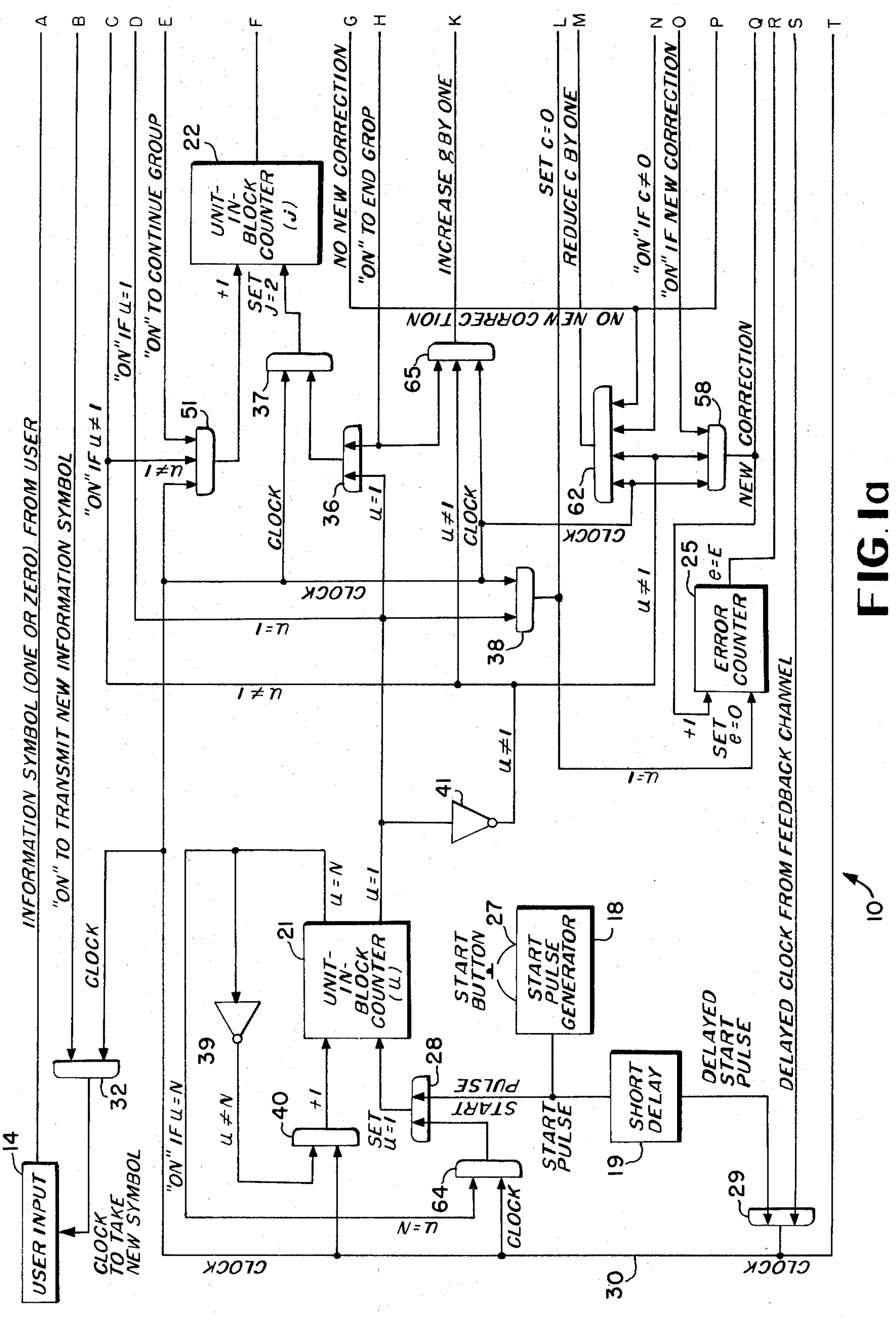
FIG. 1 is a simplified logic schematic of sending station apparatus embodying the inventive concept.

The concept underlying the present invention comprises a scheme wherein a noiseless feedback channel and block coding are used for optimum transfer of binary digital data. A code word of N binary symbols is said to convey one of M messages. If $M=2^K$ this would permit the transfer of $K$ information bits. After each of the $N$ symbols has been transmitted, the sending station awaits a return of the received symbol from the far station over the noiseless feedback channel. If the return symbol is not that which had been transmitted an error is recognized. The first $E$ errors which are recognized can be corrected. By setting the ratio $E/N$ larger than the channel probability of error, and by making $N$ very large, error-free transmission can be obtained. Each $N$ symbol code word comprises $K$ symbols conveying information where $K$ is the number of information bits conveyed. Correction is achieved by $eQ$ symbols and $(E-e)Q$ symbols are used to complete the block of $N$ symbols. After each of the first $E$ errors is detected, $Q$ correction symbols are inserted into the transmitted code word. If less than $E$ errors occur, when all $k$ information-carrying symbols and corrections have been sent, the block is filled with reversal symbols, each being the reverse of its predecessor.

Each correction system is a repetition of the correct value of the symbol received erroneously. If a correction symbol is received in error (without the number of errors exceeding $E$), $Q$ additional correction symbols are inserted. The actual number of corrected errors, $e$, is not greater than $E$. Upon receipt of an entire block, a correction is recognized by the pattern of a one followed by $Q$ zeros or a zero followed by $Q$ ones.

Errors are removed on reception by examining each $(Q+1)$ successive symbols in the block, starting with the most recently received and replacing the $(Q+1)$ symbols which form a correction pattern by a single symbol with the corrected value. Thus a one followed by $Q$ zeros is replaced by a single zero, and a zero followed by $Q$ ones is replaced by a single one. After each correction, the entire block (which is now reduced by $Q$ symbols) is reexamined beginning with the last $(Q+1)$ symbols in the partially corrected block for additional correction patterns. Correction is completed when $E$ errors have been corrected or when no correction patterns are present in the block. Separator symbols prevent the unintended occurrence of a correction pattern. When they have been removed, the first $K$ of the symbols remaining are used to determine the information conveyed.

The errorless transmitted sequence must not itself contain a correction pattern.

As stated previously, binary digital data and correction information are transferred by means of a noisy forward communication channel, and a noiseless feedback channel is used to return each symbol as it is received at the sending station. A block of $N$ symbols is transmitted where each block includes $K$ information symbols and where each of the $K$ information symbols conveys one bit of information. The $K$ information symbols in a block are formed into $G$ groups of symbols where the first group includes $(Q-1)$ information symbols and where the remaining $(G-1)$ groups each includes $(Q-2)$ information symbols. A separator symbol comprising the inverse of the information symbol it follows is transmitted after each group of information symbols. $Q$ correction symbols comprising repetitions of the correct symbol are sent after each error is detected and are inserted immediately after the error. If the number of errors, $e$, is less than $E$, then $(E-e)Q$ reversal symbols, where each symbol is the inverse of the symbol it follows, are sent to complete the $N$ symbols of the block.

The number of bits of information conveyed in each block, and also the number of information symbols in the block is equal to $K$, where $K=G(Q-2)+1$. The total number of symbols transmitted is $N=K+G+EQ$. The numbers $E$, $G$, and $Q$ must be integers. $E$ is equal to the largest number of errors which can be corrected; $G$ is the number of groups of information symbols in the block, and also the number of separator symbols in the block; and $Q$ is the number of correction symbols used to correct each error.

Efficiency and accuracy are achieved by maximizing the ratios $K/N$ and $E/N$. $K/N$ is defined as the data rate and $E/N$ is defined as the rate at which errors can be corrected. The minimum value of $Q$ must be at least three. A large value for N increases the delay caused by decoding, but also reduces the probability that any block will have an excessively large proportion of errors. For given values of $N$ and $E/N$, selecting $Q$ as the smallest integer such that $E/N \geq [1-(1/N)]/(-Q^2-Q+1)$ maximizes the ratio $K/N$.

Figure 1B:
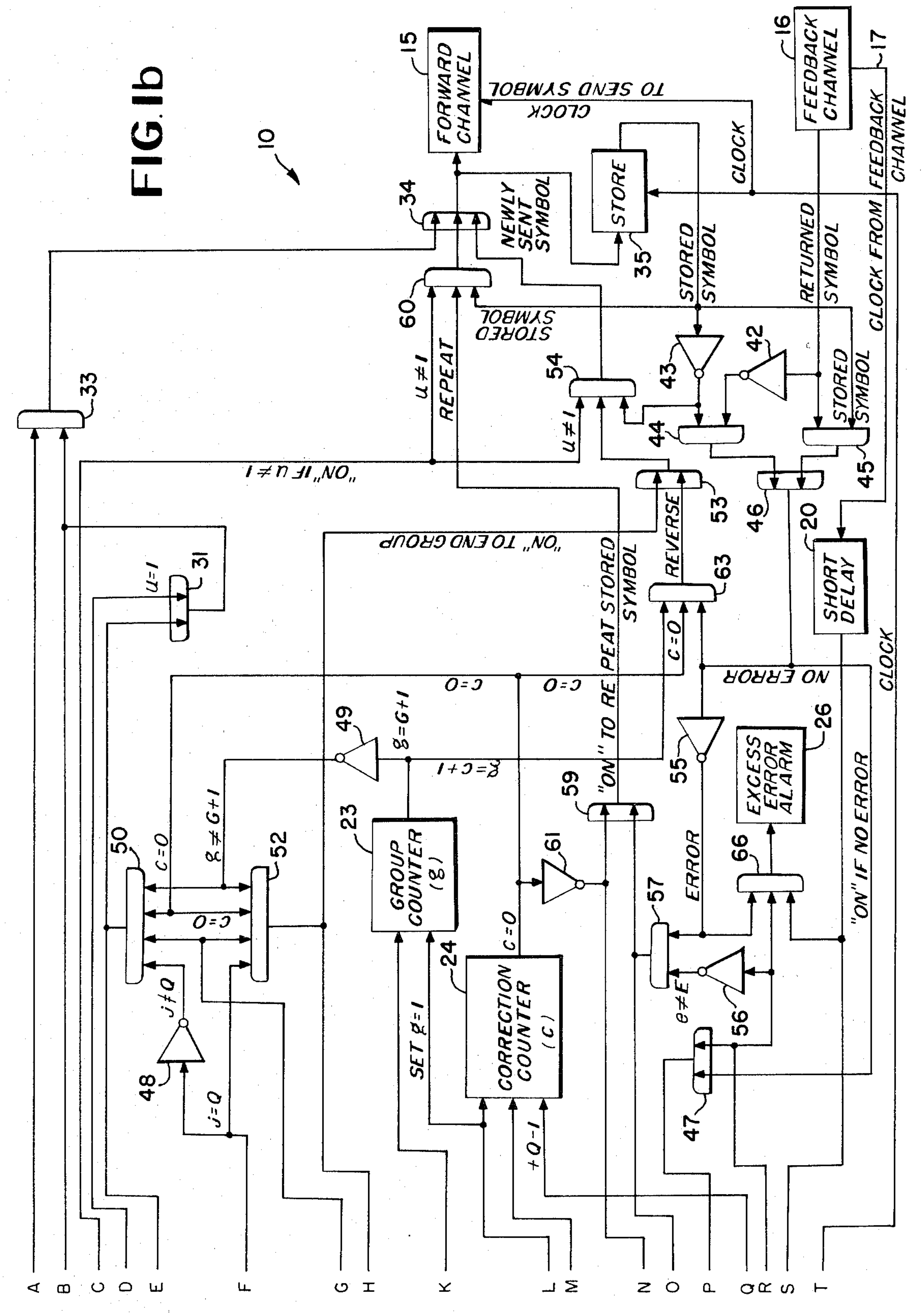
Figure 2A:
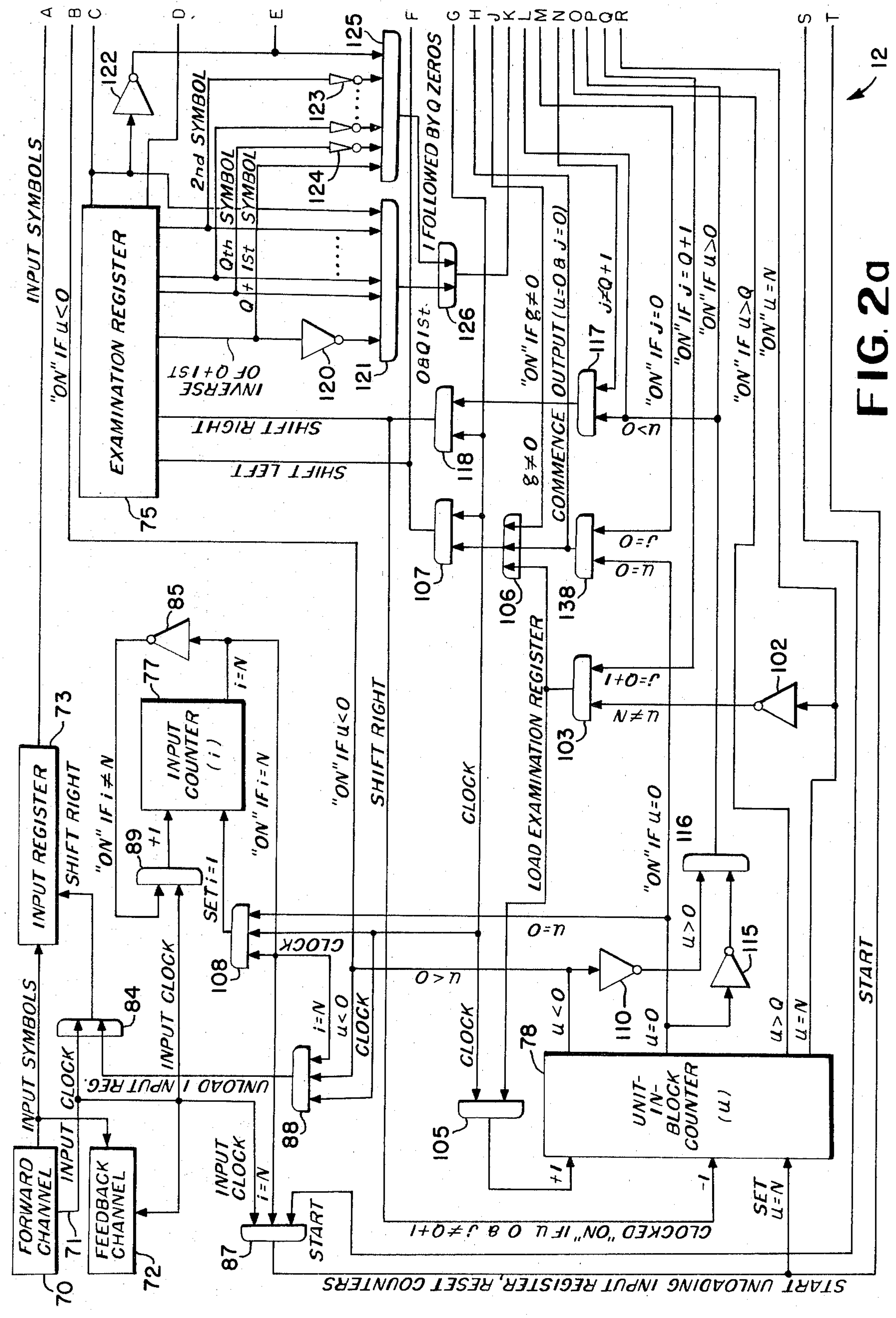
FIG. 2 is a simplified logic schematic of the receiving station apparatus corresponding to the apparatus of FIG. 1.
Figure 2B:
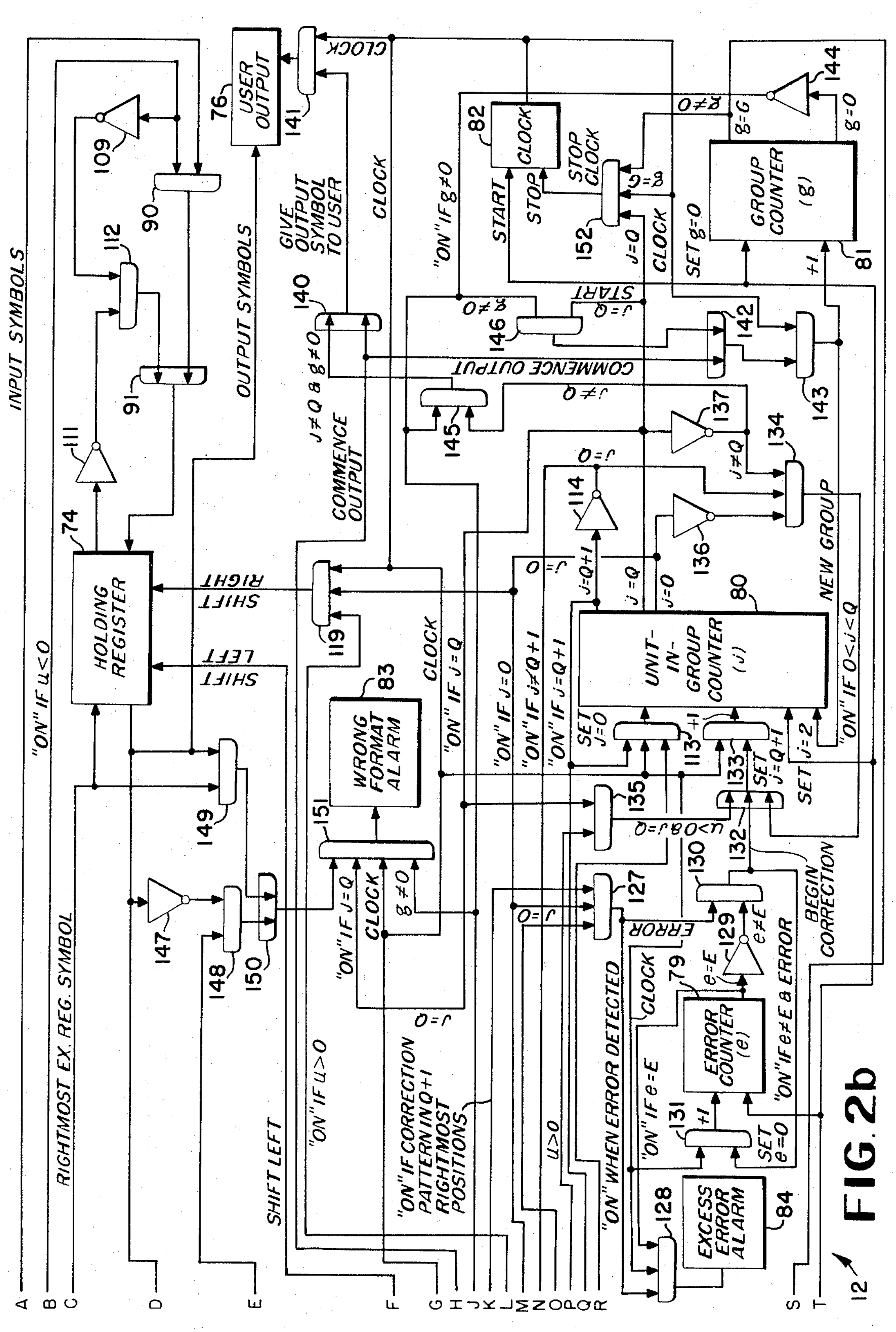

In the discussion of FIGS. 1 and 2 which follows, the following general component operational characteristics were utilized. The counters respond to commands to take a set to a particular count, increase their count by one, or by $Q-1$, or decrease their count by one, and to feed a positive, yes, or one output to certain lines when the corresponding count is reached.

Registers hold symbols, shift the symbols to right or left on demand, and where taps are shown, present the value of the symbol in that position at that tap. OR gates present a positive, yes, or one output when either input has that value, and a negative, no, or zero output only when both (or all if more than two) inputs have that level.

AND gates pass a clock or start pulse only when all other inputs are positive, yes, or one. AND gates which are not used to pass clock pulses, present a positive output only when all inputs are positive, and a negative output if any inputs are negative.

Short delays delay pulse output long enough to let other circuits settle themselves, and in particular to allow the input register 73 (FIG. 2) at the receiving station be completely unloaded before a new symbol is sent and received. The short delay in the start pulse line allows the unit-in-block counter 37 of FIG. 1 to be set to $u=1$ before a clock pulse hits it. The other short delay of FIG. 1 sets up correct levels before the new clock appears.

The expression "channel" refers to one end of a one-way transmission path, or data link, with all of the equipment necessary to send, at one end, and receive, at the other. User input and user output refer to a source of data and a sink which will take data, respectively.

Clock pulses provide the timing to the symbol of FIGS. 1 and 2. Receipt of a symbol must be accompanied by creation of a clock pulse announcing its arrival. Registers are shifted, and counts are changed, on application of a clock pulse. The clock generates clock pulses at regular intervals once started and until stopped.

FIG. 1 and FIG. 2 are simplified schematic diagrams of the sending station 10 and the receiving station 12, which with the data link which connects them comprise the preferred embodiment of the present invention. The data link comprises a forward channel which conveys binary symbols from the sending station to the receiving station, but which, due to noise or distortion, may reverse the symbol conveyed so that an error occurs, and a feedback channel which is relatively noiseless and which returns the received symbol from the receiving station to the sending station where it can be compared with the symbol which had been transmitted to determine whether an error occurred.

With reference to FIG. 1, a sending user provides the user input 14 a stream of input data in the form of a sequence of binary symbols. The data is collected at the sending station 10 into blocks of symbols. Each block contains K information symbols where $K=G(Q-2)+1$. The information symbols in each block are arranged into $G$ groups of symbols where the first group contains $(Q-1)$ information symbols, and where each of the remaining $(G-1)$ groups contains $(Q-2)$ information symbols. An error is marked by following the symbol which comparison with that returned on the feedback channel shows not to have been correctly received at the receiving station by a set of $Q$ repetitions of the same value.

A separator symbol is inserted after each group of information symbols where each separator symbol has a value opposite to the information symbol it follows, whereby no $Q$ symbols will be transmitted with the same value except to mark a detected error. Not more than $E$ errors are corrected in each block, and if fewer than $E$ errors are corrected, reversing symbols are inserted at the end of the block of symbols transmitted, so that each block transmitted consists of $N$ binary symbols, where $K=G(Q-2)+1$ are information symbols, $G$ are separator symbols, $eQ$ are correcting symbols, and $(E-e)Q$ are reversing symbols.

The number of errors corrected, $e$, does not exceed $E$, and the total number of symbols transmitted is equal to $N=K+G+EQ$.

The receiving station 12 stores and returns each symbol received. When a block of $N$ symbols has been received, the block is examined to determine whether any $Q$ successive symbols in the block have the same value, thereby indicating an error. Starting with the last symbols received, each set of $Q+1$ symbols in which the earliest has one value and the following $Q$ sumbols have the opposite value is replaced by a single symbol with the value of the $Q$ identically-valued symbols. After each correction, the entire block is reexamined. When all such sets of symbols have been corrected, or when the maximum number of $E$ errors has been corrected the separator symbols are dropped and the information symbols are given to the receiving user.

The user input 14 is a register or other source of binary symbols which can be clocked into the system from the sending user. The forward channel 15 is a transmitter into which symbols can be clocked for conveyance to the receiving station 12. The feedback channel 16 is a receiver which returns symbols which had been received at the receiving station and transmitted back to the sending station. The reception of a returned symbol generates a clock pulse on line 17. A start pulse generator 18 is used to initiate processing.

Two short delays 19 and 20 are used to adjust timing of clock actions. The unit-in-block counter 21 runs from $u = 1$ to $u = N$ and marks the number of the next symbol in the block to be sent. The unit-in-group counter 22 runs from $j = 2$ to $j = Q$. The separator symbol is treated as the $Q$th symbol in the group it finishes and the first symbol in the next group, so that, except in the first group which has one more information symbol, the information symbols in each group are numbered $j = 2$ through $j = Q - 1$. The number of the next symbol in the group is marked by $j$.

The group counter 23 runs from $g = 1$ through $g = G + 1$ and marks the group. The count $g = G + 1$ shows that all of the information symbols have been transmitted. The correction counter 24 runs from $c = 0$ to $c = E(Q - 1)$ and shows the number of additional correction symbols needed. As the discovery of an error is accompanied by transmission of one correction symbol only $c = Q - 1$ additional symbols must be added for that error.

The error counter 25 runs from $e = 0$ to $e = E$ and shows the number of errors corrected. The excess error alarm 26 shows an indication when more than $E$ errors are detected. Inverters, AND gates and OR gates, to be described hereinafter, are used to perform the desired logic functions.

Operation of the system of FIG. 1 is initiated as follows. The start button 27 is activated to energize the start pulse generator 18 which produces a start pulse. The start pulse (or the clocked state $u = 1$) passes through an OR gate 28 to set the unit-in-block counter 21 to the state $u = 1$. The start pulse also passes through a short delay 19 to become a delayed short pulse. The pulse, or the delayed clock from feedback channel passes through the OR gate 29 to become a clock pulse on line 30.

The state $u = 1$ (or the state "continue group") from the counter 21 is passed through the OR gate 31 to become the state transmit new information symbol which when applied to the AND gate 32 enables the clock pulse to shift an information symbol out of the user input 14.

The value of the information symbol is enabled by transmit new information symbol and is passed through the AND gate 33. With the junction of $u \neq 1$, repeat stored symbol, and stored symbol at the AND gate 60, a junction of $u \neq 1$, reverse or end group, and the inverse of stored symbol at the gates 53 and 54, the value of the information symbol is passed through an OR gate 34 from which it is also clocked into the store 35 where it is held until a symbol is fed back, and into the forward channel 15 from which it is transmitted to the receiving station 12.

The state $u = 1$ from the counter 21 is passed with end group from the gate 52 through the OR gate 36 and at AND gate 37, it enables the clock pulse to set the unit-in-group counter 22 to the state $j = 2$, indicating that the next information symbol sent will be the second in the group. The state $u = 1$ also enables the clock pulse to pass through AND gate 38 to set the correction counter 24 to $c = 0$, the group counter 23 to $g = 1$, and the error counter 25 to $e = 0$ thereby indicating that the first group of information symbols is being sent, that no corrections are necessary, and that no errors have been corrected.

While $u = 1$ and until additional $N - 2$ symbols have been sent, the next symbol will not be the $N$th, and the unit-in-block counter 21 will not be in the state $u = N$. The inverse $u \neq N$, obtained through inverter 39, at AND gate 40 enables the clock pulse to add +1 to the count of the unit-in-block counter 22. As this takes the count out of the state $u = 1$, the inverse can be obtained through the inverter 41.

Continuation of the group is then accomplished as follows. Receipt of a returned symbol through the feedback channel 16 generates a clock on line 17. The inverse of the returned symbol is obtained from the inverter 42 and compared at the AND gate 44 with the inverse of the stored symbol obtained from the inverter 43. The returned symbol is compared with the stored symbol at the AND gate 45. If both have a value of one or if both have a value of zero (with inverses of value one), the value one is passed through OR gate 46 to become the state no error. This state (with $e = E$) is passed through the OR gate 47 to become the state no new correction. While $j = 2$ and until $Q - 2$ additional transmissions occur, the state $j = Q$ does not hold at the counter 22, and its inverse, $j \neq Q$, is obtained from the inverter 48. While $g = 1$ and until all of the $G$ groups have been completed the state $g = G + 1$ does not hold at the counter 23, and $g \neq G + 1$ is obtained from the inverter 49. The junction of the states no new correction, $j \neq Q$, $c = o$, and $g \neq G + 1$ is passed through AND gate 50 to become the state continue group. This is passed through the gates 31 and 32 to allow a new information symbol to be transmitted as described previously.

The clock pulse 17 from the feedback channel 16 passes through the short delay 20 to become the delayed clock pulse which passes through the OR gate 29 to become the clock pulse 30 for the next transmission. Each clock pulse, until the $N$th, is enabled by the state $u \neq N$ to increase the count of the unit-in-block counter 21 by one. At the AND gate 51, the states $u \neq 1$ and continue group jointly enable the clock pulse to increase the unit-in-group counter 22 count by one.

Completion of a group is accomplished as follows. When $Q - 1$ symbols (including the preceding separating symbol in each group but the first as the first symbol of the group) have been transmitted, the count of the unit-in-group counter 22 becomes $j = Q$, indicating the end of the group has been reached. The junction of the states no new correction, $J = G$, $c = o$, and $g \neq G + 1$ is passed through the AND gate 52 to become the state end group. This state (or the junction of the states $g = G + 1$, $c = 0$, and no error) is passed through OR gate 53 and with the state $u \neq 1$ enables the value of the inverse of the stored symbol to pass through AND gate 54 to the OR gate 34 for transmission. Thus a separator symbol, the opposite of the last symbol sent, completes the group. The state end group passes through OR gate 36 to enable the clock pulse through the AND gate 37, to reset the unit-in-group counter 22 to $j = 2$.

Correction is performed as follows. Unless the stored symbol and the returned symbol are alike, the state no error is not obtained, but its inverse error appears at the inverter 55. While $e = 0$ and until $E$ errors have been detected, the state $e = E$ is not obtained at the counter 25. Its inverse $e \neq E$ appears from the inverter 56. Junction of the states error and $e \neq E$ is passed through AND gate 57 to become the state new correction. Junction of states new correction and $u \neq 1$ enable the clock pulse to pass through AND gate 58 to increase the count of the error counter 25 by one. If the count has already reached the state $e = E$, this state is passed through the OR gate 47 to become state no new correction since only $E$ errors can be corrected in a block. The junction of $e = E$ with error at the gate 66 enables the delayed clock pulse from the feedback channel 16 to activate the excess error alarm 26.

The state new correction (or the state $c \neq 0$) is passed through the OR gate 59 and with state $u \neq 1$ enables the stored symbol to be passed through AND gate 60 to the OR gate 34 for transmission. Thus an error is followed by repetition of the intended symbol which had been stored. The state new correction also increases the count in the correction counter 24 by $(Q - 1)$, so that a total of $Q$ correcting symbols will be sent. The increased count occurs through the AND gate 58.

When the state $c = 0$ at the counter 24 no longer holds its inverse, $c \neq 0$ is obtained from the inverter 61. Through the OR gate 59, $c \neq 0$ enables the stored symbol to be passed (providing $u \neq 1$) through the AND gate 60 for transmission to continue correction. The junction of $c \neq 0$, $u \neq 1$, and no new correction enables the clock pulse to pass through the AND gate 62 to reduce the count of the correction counter 24 by one. When all correcting symbols have been transmitted, the count will reduce to $c = 0$. Occurrence of an additional correctable error while a correction is being made increases the number of correcting symbols by $Q$.

The end of a block is indicated in the following manner. When the last group has been completed, the count of the group counter 23 reaches $g = G + 1$. Junction of this state with $c = 0$ and no error is passed through the AND gate 63 to become the state reverse which is passed through OR gate 53 (with $u \neq 1$) to enable the inverse of the stored symbol to be transmitted through gate 54 as a reversing symbol. Thus, if fewer than $E$ errors are corrected, the block is completed by a succession of $(E - e)\ Q$ symbols which alternate in value. This prevents a succession of $Q$ symbols with the same value from appearing except by error or to mark correction of an error.

When $(N - 1)$ symbols have been transmitted in a block, the count of the unit-in-block counter 21 is increased to $u = N$. The next clock pulse, which causes transmission of the $N$th and last symbol of the block, is enabled by the state $u = N$ to pass through the AND gate 64 and thence through the OR gate 28 to reset the unit-in-block counter 21 to $u = 1$ indicating it is ready for a new block. The return of the Nth symbol to the feedback channel 16 will generate the clock pulse from the feedback channel to start the new block. The state $u = 1$ will prevent an error from having any effect except to activate the excess error alarm 26 if $e$ already equalled $E$. If $e \neq E$, the last symbol will be a reversing symbol, and an error will have no effect.

The processing which occurs at the receiving station 12 will be described with reference to FIG. 2. The forward channel 70 comprises receiver apparatus at which signals from the sending station 10 are received. Each symbol received generates an input clock pulse at line 71. The logic at the receiving station 12 must be sufficiently rapid to permit each block of data to be processed while the last symbol is being returned to the sending station and while the resulting clock pulse from the feedback channel 16 at the sending station is passing through a short delay before initiating a new transmission.

The feedback channel 72 comprises a transmitter into which each received symbol is returned to be returned to the sending station 10. The input register 73 holds N symbols as they are received at forward channel 70. The holding register 74 holds $N$ symbols; first after they are taken from input register 73 while on their way to examination register 75; then while being examined; and finally while being taken out to the receiving user. The examination register 75 holds $N$ symbols, and the last $Q + 1$ symbols entered are accessible through taps. It also holds the symbols passed through the holding register 74 for examination and returns them to the holding register after examination. The user output 76 is an output into which the information symbols, after examination and correction as required, are passed to the receiving user (not shown).

The input counter 77 counts from $i = 1$ to $i = N$ to mark the number of the next symbol to be received. The unit-in-block counter 78 counts from $u = -N$ to $u = N$. Negative counts indicate that unloading of the input register 73 is incomplete; positive counts show the number of symbols in the examination register 75 which have been loaded or which are yet to be returned to the holding register 74. The error counter 79 counts from $e = 0$ to $e = E$, the number of errors corrected. The unit-in-group counter 80 counts from $j = 0$ to $j = Q + 1$. While set at $j = Q + 1$, the examination register 75 is loaded or reloaded; while set at $j = 0$, the examination register is examined and unloaded.

When an error is found, the count increases from $j = 0$ to $j = Q + 1$ while the symbol in error and all but one of the $Q$ correcting symbols are discarded. During output, the count goes from $j = 2$ to $j = Q$ to mark the $Q - 2$ information symbols in each group but the first and the separating symbol to be discarded, which can be regarded as the $Q$th symbol of one group and the first symbol of the next group so that the information symbols are numbered 2 through $Q - 1$.

The group counter 81 counts from zero to $G$. The count $g = 0$ is used to allow the examination register 75 to be loaded and examination to take place until all indicated corrections can be made prior to output of the information symbols to the receiving user. The clock 82 provides periodic pulses during processing which unloads the input register 73, loads the examination register 75, examines the block of received symbols, loads them back into the holding register 74, and unloads the holding register into the user input 76. A wrong format alarm 83 indicates that the expected pattern of separating symbols is not present. The excess error alarm 84 indicates that more patterns intended to show error have been observed than can have been inserted by the sending station. Inverters, AND gates and OR gates are used to provide required logic.

Initiation of processing is performed in the following manner. As each symbol is received by the forward channel 70 from the sending station 10, an input clock pulse is produced. The input clock pulse 71 or a clock pulse enabled by $u < 0$ and $i = N$ at the gate 88 passes through the OR gate 84 to shift the received input symbol into the input register 73. The input clock pulse also shifts the input symbol back to the feedback channel 72 for retransmission to the sending station. While $i < N$, the input counter 77 is not in the state $i = N$. But the inverse, $i \neq N$, is obtained from the inverter 85. The state $i \neq N$ enables the input clock pulse to pass through the AND gate 89 and increase the count of the input counter 77 by one. Eventually the count indicating the number of the input symbol next to be received will reach $i = N$. The $N$th symbol received will be accompanied by the $N$th input clock pulse which will be enabled by the junction of $i = N$ and $g = G$ from the counter 81 to pass through the AND gate 87. The state $g = G$ insures that processing of the previous block is complete.

The start pulse from AND gate 87 performs several functions: it resets the unit-in-block counter 78 to $u = -N$ and readies it to unload the input register 73; it also sets the error counter 79 to $e = 0$; it sets the unit-in-group counter 80 to $j = Q + 1$ and readies it to load the examination register 75; it sets the group counter 81 to $g = 0$ to prevent output until examination is complete and the holding register 74 has been reloaded; and it starts the clock 82 which generates a clock pulse as previously described.

Loading of the examination register is achieved as follows. While $u = -N$ and until the count has increased to $u = 0$, the state $u$ less than zero holds at the counter 78. The junction of the states $i = N$ and $u < 0$ enable the clock pulse to pass through the AND gate 88 to the OR gate 84 and to shift symbols out of the input register 73. With $u < 0$, the value of the rightmost and earliest symbol in the input register is passed through the AND gate 90 into the OR gate 91 (in place of the inverse of the rightmost or latest symbol already in the register as enabled by the inverse of $u < 0$) and into the holding register 74. While $u = -N$ and until the count is increased by $2N$ and while both the holding register and the examination register are filled, the state $u = +N$ does not hold; but, its inverse $u \neq N$ is obtained from inverter 102. Junction of states $u \neq N$ and $j = Q + 1$ as set by the start pulse are passed through the AND gate 103 to become the state load examination register. The state load examination register enables the clock pulse to operate through the AND gate 105 to increase the count of the unit-in-block counter 78 by one. Load examination register, commence output, and $g \neq 0$, pass through the OR gate 106 and enables the clock pulse to pass the AND gate 107 to become shift left. Shift left shifts symbols into the right positions of the examination register 75 and holding register 74, out of the left or earliest position of holding register 74, and through both of these registers.

Each of the first $N$ clock pulses unloads a symbol from the input register 73 into the holding register 74. The $N$th clock pulse causes the unit-in-block counter 78 to count to zero, so that $u = 0$. Junction of $u = 0$ and $i = N$ enables the next clock pulse to pass through AND gate 108 to set the input counter 77 back to $i = 1$, ready for new input symbols. With $u = 0$, or a higher count, the state $u < 0$ no longer holds, but its inverse, $u \geq 0$ is obtained from the inverters 109 and 110.

The state $u \geq 0$ enables the inverse of the rightmost symbol in the holding register 74 obtained through the inverter 111 to pass through the AND gate 112 to the OR gate 91. Thus, further left shifts of the holding register 74 cause additional reversing symbols (alternating in value) to fill the register after the $N$ input symbols have been loaded and when errors and extra correcting symbols are discarded. Loading of the examination register 75 from the holding register 74 continues until $u = N$ and all $N$ input symbols have been loaded.

Examination and correction at the receiving station are accomplished in the following manner. Junction of $u = N$ and $j = Q + 1$ enables the clock pulse to pass through the AND gate 113 to set $j = 0$ in the unit-in-group counter 80, which allows the contents of the examination register 75 to be examined for error patterns while the symbols are reloaded into the holding register 74. With $j = 0$, the state $j = Q + 1$ no longer holds in the counter 80, and its inverse $j \neq Q + 1$ is obtained from inverter 114. The inverse of $u = 0$ is obtained from the inverter 115 as $u \neq 0$. The junction of $u \geq 0$ and $u \neq 0$ is passed through the AND gate 116 as $u > 0$ signifying that the examination register 75 has not been completely unloaded. Junction of $u > 0$ and $j \neq Q + 1$ is passed through the AND gate 117 to enable a clock pulse to pass the AND gate 118 as a shift right pulse for the examination register 75, which also decreases the count of the unit-in-block counter by one to indicate a symbol has been shifted out of the examination register.

The clock pulse which occurs after the state $u = N$ is reached sets $j = 0$, and the junction of $j = 0$ and $u > 0$ enables the next clock pulse to pass the AND gate 119 to shift the holding register 74 right. While $j = 0$ and $u > 0$ both registers shift right, transferring symbols between them.

The $Q + 1$ rightmost and latest symbols in the examination register 75 are tapped. The inverse from the inverter 120 of the $Q + 1$st symbol, which might be in error, is compared with the other $Q$ symbols to its right (which followed it) in the AND gate 121. The $Q + 1$st symbol and the inverses from the inverters 122 . . . 124 of the other $Q$ symbols are compared in the AND gate 125. If the $Q + 1$st has one value, and the other $Q$ symbols all have the opposite value, showing $Q$ identical correcting symbols had been sent to correct an error, the state correction pattern is obtained from OR gate 126.

If the count in the unit-in-block counter 78 is $Q$ or less, there are not $Q + 1$ symbols from the block in the examination register 75, and a correction pattern is meaningless. The junction of $u > Q$, $j = 0$ and correction pattern passes through the AND gate 127 to become the state error detected. If $E$ errors, the maximum number which could be corrected, have already been dealt with, the junction of $e = E$ and error detected enable the clock pulse to pass the AND gate 128 to activate the excess error alarm 84. The inverse of $e = E$ is obtained from inverter 129 as $e \neq E$.

Junction of $e \neq E$ and error detected is passed through the AND gate 130 as begin correction. Begin correction enables the clock pulse to pass the AND gate 131 and increase the count of the error counter by one. Begin correction (or $0 < j < Q$ or the junction of $u > 0$ and $j = Q$) is passed through the OR gate 132 to enable the clock pulse to pass through the AND gate 133 to increase the unit-in-group counter count by one.

This stops the right shift into the holding register 74, so that only the last correcting symbol, shifted as the count is increasing from $j = 0$ to $j = 1$, is retained. The other $Q-1$ correcting symbols are shifted out of the examination register and discarded as the count increases to $j=Q$. The symbol which differs from the $Q$ correcting symbols, and which may be supposed to have been in order, is shifted out and discarded as the count increases from $j=Q$ to $j=Q+1$. As the AND gate 134 is used during the output phase with $u=0$, the junction of $u>0$ and $j=Q$ is passed through the AND gate 135 to the OR GATE 132 to enable the clock pulse to pass the AND gate 133 to complete the count from $j=Q$ to $j=Q+1$. The inverse of $j=0$ is obtained from the inverter 136, and the inverse of $j=Q$ is obtained from the inverter 137. The junction of these two inverses with $j \neq Q+1$ is passed through the AND gate 134 as $0<j<Q$ which goes through the OR gate 132 to increase the unit-in-group counter 80 count. When the examination register 75 is completely unloaded, the state $u=0$ is reached. While it is partially loaded or wholly loaded, the state $u>0$ holds. Since a correction started only if $u>Q$, the count $j=Q$ will be reached during correction with $u>0$.

Correction of one error replaces $Q+1$ symbols with a single symbol; the possibility exists that this may reveal a new correction pattern. Each correction is completed as the state $j=Q+1$ is reached. The junction $j=Q+1$ and $u \neq N$ is passed through the AND gate 103 as load examination register to enable the next clock pulse to shift the two registers left and reload the examination register 75. This process continues until $E$ corrections have been made or until no further correction patterns are found.

The output of the system of FIG. 2 results as follows. Eventually no further correction patterns will occur or the maximum number, $E$, of correctable errors will be found, and the examination register 75 will completely unload with $j=0$ (the state set by $u=N$ and $j=Q+1$ when last loaded). The examination register will be completely unloaded when $u=0$. Junction of $u=0$ and $j=0$ is passed through the AND gate 138 as commence output. Commence output passes through the OR gate 106 to initiate a shift left to begin unloading the holding register 74. Commence output (with junction of $g \neq 0$ and $j \neq Q$) is passed through the OR gate 140 enable the clock pulse to pass the AND gate 141 and shift the first information symbol from the holding register to the user output 76.

Commence output is passed (with junction of $j=Q$ and $g \neq 0$) through OR gate 142 to enable the clock pulse to pass AND gate 143 to set the unit-in-group counter 80 to $j=2$. This indicates that the second information symbol, or the second symbol in group counting separating pulse from previous group as number one, is next, and increases the count in the group counter 81 by one to show that the new group is being shifted out. Once the count $g$ has been increased, $g=0$ no longer holds; but its inverse $g \neq 0$ is obtained from the inverter 144. Within the group, the count rises from $j=2$ through $j=Q-1$ while information symbols are shifted out. The state $g \neq 0$ is passed through the OR gate 106 to enable the clock pulses to shift out of the holding register 74. The junction of $j \neq Q$ and $g \neq 0$ is passed through the AND gate 145 to the OR gate 140 to enable the information symbols to be given to the user input 141. The state $0<j<Q$ passes through the OR gate 132 to enable the clock pulse to increase the $j$ count in the counter 80 until it reaches $Q$, at which point the junction of $j=Q$ and $g \neq 0$ is passed through the AND gate 146 to the OR gate 142 and to the AND gate 143 where the clock pulse is enabled to reset $j=2$ and add one to the count of the group counter 81. The $Q$th symbol, which will be a separator symbol is not shifted into the user output.

As the symbols being shifted left from the holding register 74 are shifted into the examination register 75 as well as to user output 76, the $Q$th symbol in a group can be compared with the $Q-1$st symbol. The inverse of the $Q-1$st symbol (the rightmost in the examination register) is obtained from the inverter 122, and the inverse of the $Q$th symbol (the leftmost in the holding register) is obtained from the inverter 147. The inverses are compared at the AND gate 148, while the symbols without inverse are compared at the AND gate 149. If either set is identical, an output passes through the OR gate 150. The junction of this output with states $j=Q$ and $g \neq 0$ (showing that the $Q$th symbol had been reached during output and it did not behave as a separator symbol should, opposite the preceding symbol) enables the clock pulse to pass through the AND gate 151 and activate the wrong format alarm 83.

When the last information symbol of the last group has been shifted in the user output 76, the junction of $g=G$ and $j=Q$ will enable the next clock pulse to pass the AND gate 152 and stop the clock 82. This will leave the group counter 81 in the state $g=G$, so that when a new block has been loaded into the input register 73, the Nth input clock pulse will be passed through the AND gate 87 as a start pulse. Initial turn on of equipment must put the group counter 81 into state $g=G$.

Thus it can be appreciated that apparatus has been disclosed for improving performance of digital communication systems by means of a noisy forward channel which sends symbolically coded data and corrections and a noiseless feedback channel which returns data to the sending station.

The system disclosed herein utilizes a substantially noiseless feedback channel. Redundancy is added by means of separator symbols which prevent new data from looking like corrections; correction symbols; and, reversing symbols to fill a block if the number of errors does not reach the number allowed. A delay is used between transmission of successive symbols sufficient to allow each received symbol to be fed back and compared with the symbols which had been sent, and further delay is used after the data has been received until an entire block has been received and processed.

The disclosed system provides a constant rate of transmission, i.e., a fixed time to transmit a fixed number of blocks of data. Thus, for example, a satellite which is not in a fixed position relative to a ground station can discharge a load of data while in contact with a ground station, or a combat patrol can send a prepared message in a fixed number of seconds. The novel system can correct up to a fixed number of errors per block, and can provide the sender with knowledge as to whether the message was accurately received whereby a measurable efficiency is achieved.

Obviously many modifications and variations of the present invention are possible in the light of the above teachings. It is therefore to be understood that within the scope of the appended claims the invention may be practiced otherwise than as specifically described.

What is claimed is:

1. Communication apparatus comprising:

a sending station;

a remote receiving station;

said stations being connected to each other by a noisy forward communication channel and by a noiseless feedback communication channel;

said sending station comprising means for accepting input data symbols and for converting $K$ of said data symbols into $G$ groups, means for inserting a separator symbol after each of said groups, means for transmitting said $G$ groups of information symbols, said separator symbols, correction symbols and reversal symbols to form a block comprising $N$ total symbols to said receiving station by means of said forward channel;

said receiving station comprising means for returning each received symbol, as received, to said sending station by means of said feedback channel;

said sending station further including means for comparing each returned symbol of said block with the original corresponding symbol transmitted and for producing an error indication each time a difference is detected, up to a maximum of $E$ errors, means responsive to each error indication to provide $Q$ of said correction symbols, means for interrupting the transmission of said $G$ groups and separator symbols after each error is detected and for transmitting said $Q$ correction symbols to said receiving station during each interruption thereof and immediately following each error, means further responsive to the total number of errors, $e$, occurring in each block for providing $(E - e)\,Q$ of said reversal symbols if $e < E$, means for interrupting the transmission of said $G$ groups, separator symbols, and correction symbols and for transmitting said reversal symbols to said receiving station by means of said forward channel, to complete the $N$ symbols of each block and wherein $N = K + G + EQ$;

said receiving station further including means responsive to said received blocks to determine if $Q$ successive symbols have the same value thereby indicating the occurrence of an error during transmission, means for replacing each $(Q + 1)$ symbols in which the earliest symbol has one value and the successively received $Q$ symbols have the opposite value with a single value equal to the $Q$ identically-valued symbols, and means for removing said separator symbols from each block thereafter to provide error-free information symbols.

2. The apparatus of claim 1 wherein the first group of said $G$ groups includes $(Q - 1)$ information symbols, and each other group includes $(Q - 2)$ information symbols.

3. The apparatus of claim 2 wherein said separator symbol comprises the inverse of the symbol preceding it.

4. The apparatus of claim 3 wherein said correction symbols comprise $Q$ repetitions of the original symbol.

5. The apparatus of claim 4 wherein each reversal symbol comprises the inverse of the symbol preceding it.

6. The apparatus of claim 1 wherein said means for comparing each returned symbol with the original symbol includes means for storing said original symbol until the returned symbol is received and further including AND logic gate means for producing said error indication.

7. Digital communication apparatus comprising:

a sending station and a receiving station;

noisy forward channel means for sending data to said receiving station in blocks containing $K$ information symbols arranged in $G$ groups separated from each other by a separator symbol;

noiseless feedback channel means for returning each symbol as it is received to said sending station;

error detection and correction means for comparing each returned symbol with the corresponding original symbol and for interrupting the transmission of information and separator symbols each time an error is detected and for transmitting $Q$ correction symbols immediately after each error;

error counter means responsive to the total number of errors, $e$, occurring during each block for interrupting the transmission of information, separator, and correction symbols, if $e < E$, where $E$ equals the maximum number of corrections possible during each block, and for transmitting $(E - e)Q$ reversal symbols to complete said $N$ symbols in each block where $N = K + G + EQ$; and, means at said receiving station for removing said separator, correction, and reversal symbols to provide said information symbols.

* * * * *